US009865380B2

(12) United States Patent
Logakis et al.

(10) Patent No.: US 9,865,380 B2
(45) Date of Patent: Jan. 9, 2018

(54) MATERIAL COMPRISING REDUCED GRAPHENE OXIDE, A DEVICE COMPRISING THE MATERIAL AND A METHOD OF PRODUCING THE MATERIAL

(71) Applicant: ABB TECHNOLOGY LTD, Zürich (CH)

(72) Inventors: Emmanuel Logakis, Baden-Dättwill (CH); Alex Skordos, Cambridge (GB); Panagiota Chatzi, Oxford (GB)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 14/890,391

(22) PCT Filed: Jun. 24, 2013

(86) PCT No.: PCT/EP2013/063090
§ 371 (c)(1),
(2) Date: Nov. 10, 2015

(87) PCT Pub. No.: WO2014/206435
PCT Pub. Date: Dec. 31, 2014

(65) Prior Publication Data
US 2016/0133361 A1    May 12, 2016

(51) Int. Cl.
*B32B 9/00*    (2006.01)
*H01B 17/58*    (2006.01)
(Continued)

(52) U.S. Cl.
CPC ........... *H01B 17/583* (2013.01); *B32B 9/007* (2013.01); *C01B 32/23* (2017.08); *H01B 1/04* (2013.01);
(Continued)

(58) Field of Classification Search
CPC C01B 31/0438; C01B 2204/00; Y10T 428/30
(Continued)

(56) References Cited

U.S. PATENT DOCUMENTS

2010/0221508 A1   9/2010 Huang et al.
2010/0258787 A1*  10/2010 Chae ................... H01L 29/0673
                                                      257/39
(Continued)

FOREIGN PATENT DOCUMENTS

CN   102602915 A   7/2012
RU   2483021 C2    5/2013
(Continued)

OTHER PUBLICATIONS

Russian Office Action and Search Report, dated Jun. 1, 2017, for Russian Application No, 2015154966/07, with an English translation.
(Continued)

*Primary Examiner* — Daniel H Miller
(74) *Attorney, Agent, or Firm* — Birch, Stewart, Kolasch & Birch, LLP

(57) ABSTRACT

The present invention relates to a material comprising reduced graphene oxide, wherein the degree of reduction of the graphene oxide exhibits a spatial variation so that the material exhibits a gradient in the electric conductivity and/or permittivity. The material can for example be used in an electric device for purposes of field grading and/or dissipation of charges. Examples of electric devices wherein the material is beneficial includes cable accessories, bushings, power cables, microelectronics, switchgear, etc. The invention further relates to a method of producing a material for electrical applications. The method comprises treating different parts of a graphene oxide element differently, so as to achieve a different degree of reduction of the graphene oxide within the element, resulting in a sample having a gradient in the electrical conductivity and/or permittivity. The material could for example be obtained by means of applying a thermal gradient to a graphene oxide element, or by irradiation of a graphene oxide element.

18 Claims, 7 Drawing Sheets

(51) Int. Cl.
*H01B 1/04* (2006.01)
*H01B 3/18* (2006.01)
*C01B 32/23* (2017.01)

(52) U.S. Cl.
CPC ............ *H01B 3/18* (2013.01); *B32B 2250/40* (2013.01); *B32B 2307/202* (2013.01); *Y10T 428/30* (2015.01)

(58) Field of Classification Search
USPC .............................. 428/408; 423/447.1, 448
See application file for complete search history.

(56) References Cited

U.S. PATENT DOCUMENTS

| 2011/0088931 | A1 | 4/2011 | Lettow et al. |
| 2011/0206946 | A1 | 8/2011 | Schmidt et al. |
| 2011/0318257 | A1 | 12/2011 | Sokolov et al. |
| 2012/0161192 | A1 | 6/2012 | Kim et al. |
| 2012/0298974 | A1 | 11/2012 | Lee et al. |
| 2012/0302683 | A1 | 11/2012 | Ku et al. |
| 2013/0079552 | A1 | 3/2013 | Lee et al. |
| 2013/0323159 | A1 | 12/2013 | Lee et al. |

FOREIGN PATENT DOCUMENTS

| WO | WO 2012/108726 A2 | 8/2012 |
| WO | WO 2012/128748 A1 | 9/2012 |
| WO | WO 2013/040636 A1 | 3/2013 |

OTHER PUBLICATIONS

Teoh et al., "Electrical current mediated interconversion between graphene oxide to reduced grapene oxide", Applied Physics Letters, 2011, vol. 98, No. 173105, pp. 173105-1 to 173105-3.

* cited by examiner

Fig. 5
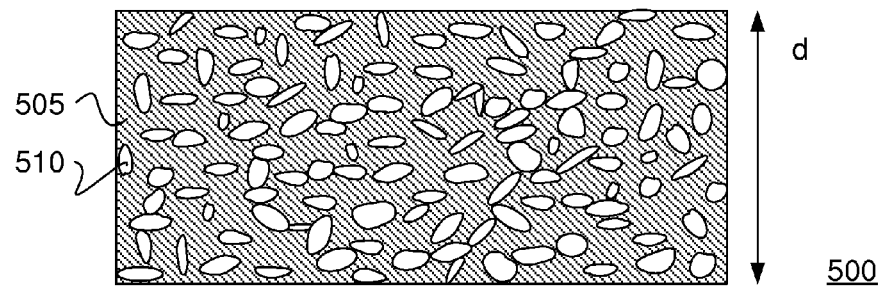
Fig. 6a
Fig. 6b
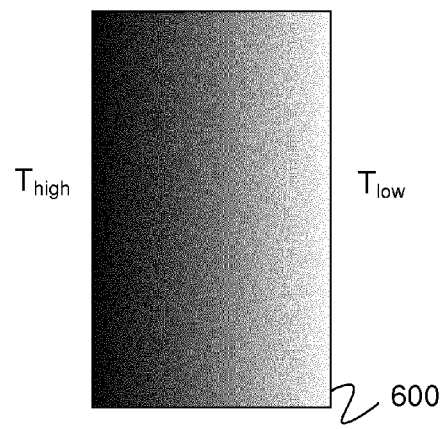
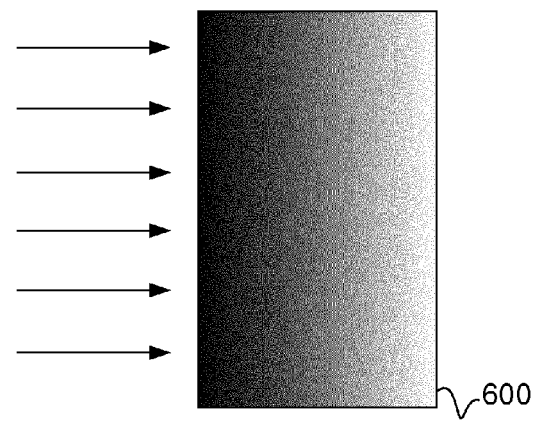
Fig. 8
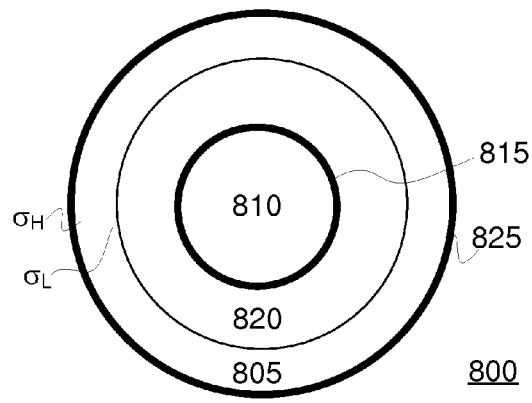

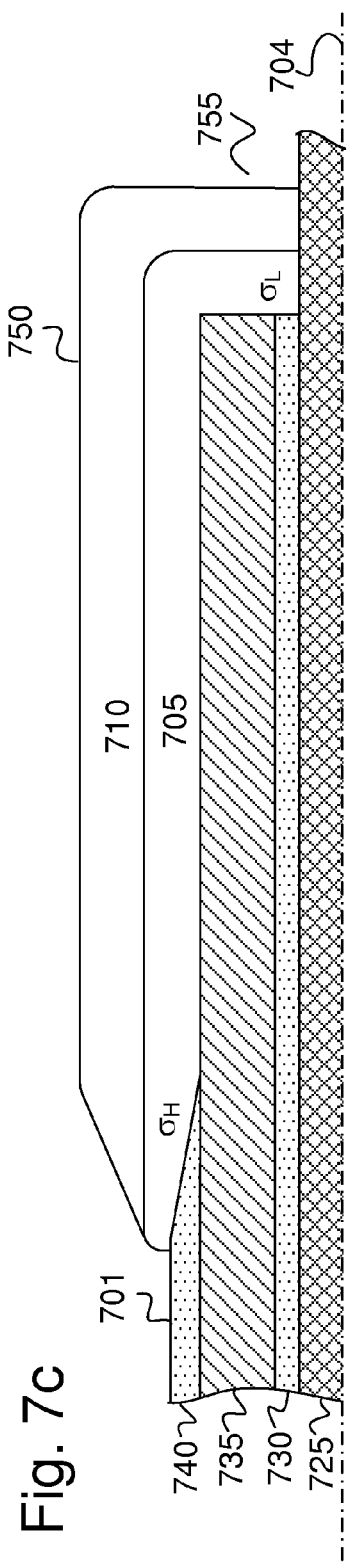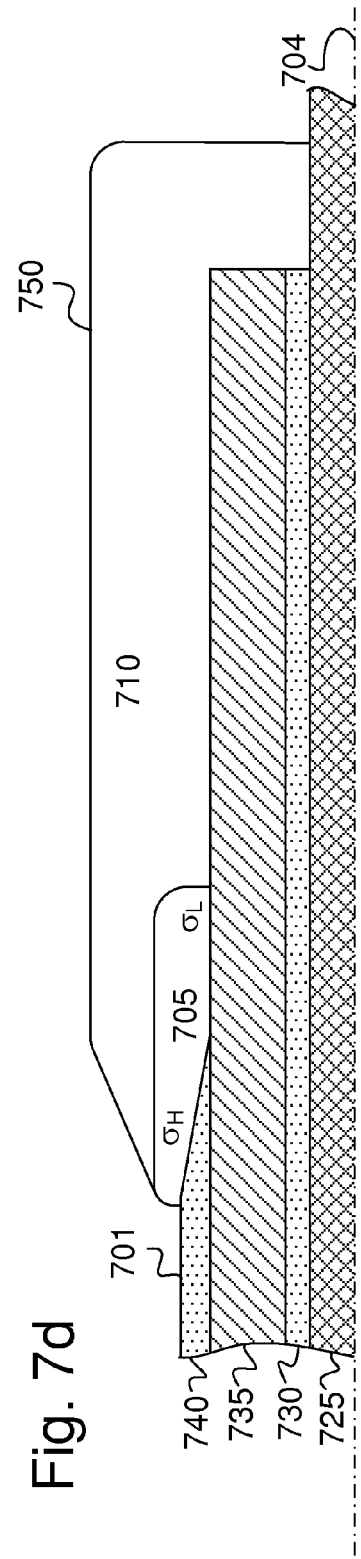

MATERIAL COMPRISING REDUCED GRAPHENE OXIDE, A DEVICE COMPRISING THE MATERIAL AND A METHOD OF PRODUCING THE MATERIAL

TECHNICAL FIELD

The present invention relates to the field of graphene oxide based materials and electric devices using graphene oxide based materials.

BACKGROUND

In many applications of electro-technology, materials of different electrical properties are combined. The distribution of electric field in and around an electric device depends on the electric properties of the materials used in the device, as well as on device geometry. In AC applications, the field distribution depends to a large extent on the permittivities of the materials of the device, while in DC applications, the field distribution is to a large extent dependent on the conductivity of the device material.

In many devices, different materials showing very distinct electrical/dielectric properties are in contact. In such devices, the equipotential lines of the electric field tend to concentrate at the interfaces towards the low permittivity or low conductivity regions. The larger the difference between permittivities/conductivities of different materials which are in contact, the more uneven the field distribution becomes. Such concentration of the electric field increases the risk of electrical breakdown, and the insulating properties of the material is thus impaired.

SUMMARY

A problem to which the present invention relates is how to avoid electric breakdown in electric devices.

A material is provided which comprises reduced graphene oxide, wherein the degree of reduction of the graphene oxide exhibits a spatial variation so that the material exhibits a gradient in the electric conductivity and/or permittivity.

In one embodiment, the ratio of the electrical conductivity of a first, high conductivity part of the material to the electrical conductivity of a second, low conductivity part of the material exceeds $10^2$.

According to one embodiment, the material comprises a composite of a polymer matrix and filler particles comprising reduced graphene oxide, where the degree of reduction of the filler particles exhibit a spatial variation.

The material may comprise graphene oxide paper which has been reduced in a manner so that the degree of reduction exhibits a spatial variation.

According to one embodiment at least two sheets of graphene oxide paper are bonded by means of an adhesive.

The invention further relates to an electric device comprising the material disclosed herein.

One embodiment provides an electric device comprising a graphene oxide material wherein the degree of reduction of the graphene oxide varies within the material so that the material exhibits a gradient in the electric conductivity and permittivity.

By using such material in an electric device, a smoothening of the electric field in the device may be achieved. Furthermore, improved conditions for dissipation of electric charges on a surface of an insulating device which is exposed to high electric fields can also be achieved by means of such material.

Hence, a reduced risk of electrical breakdown may be achieved.

In one embodiment, the electric device comprises an element made from said material; at least a second material of a second conductivity/permittivity and a third material of a third conductivity/permittivity. The second conductivity/permittivity is higher than the third permittivity/conductivity. The element comprising reduced graphene oxide is arranged to bridge the first and second further materials. In this embodiment, the element has at least two surfaces of different conductivity and/or permittivity; and the high conductivity/-permittivity surface of said element is in physical contact with the second material and the low conductivity/permittivity surface of said element is in physical contact with the third further material.

By this embodiment is achieved that the electric field distribution between the second and third materials will be smoothened.

In one embodiment, the electric device is a cable accessory; said element is arranged as an extension of a semiconducting layer into a joint insulation; and a high conductivity/permittivity surface of said element is in physical contact with said semiconducting layer.

In one embodiment, the electric device is a power cable having an insulation layer and at least one semiconducting layer; said element is arranged between at least part of the insulation layer and at least one of the at least one semiconducting layers; and a high conductivity/permittivity surface of said element is in physical contact with the at least one of the at least one semiconducting layers.

In one embodiment, the electric device comprises an insulating spacer arranged to mechanically and electrically separate two parts of the device which are arranged to be at different electrical potential; and said element forms at least part of the surface of the spacer in order to facilitate for electrical charges to leave the spacer, with a high conductivity/permittivity surface of said element facing the outside of the spacer.

According to one embodiment, the electric device is a microelectronics component comprising at least one electric contact; and said element is arranged so that a high conductivity/permittivity surface of the element is in physical contact with the electric contact.

The electric device may for example be a cable, a cable accessory such as a cable joint or a cable termination; an electric device comprising a spacer; a microelectronics component; a bushing; a rotating machine, etc.

In one embodiment, said element is arranged to be in physical contact with at least one second element of the device, wherein the material at the surface of said first element, which faces the second element, has an electrical conductivity and/or permittivity which is of the same order of magnitude as the conductivity/permittivity of the second element.

In one embodiment said element forms at least part of the surface of the device in order to facilitate for electrical charges to leave the device, with a high conductivity/permittivity surface of said element facing the outside of the device.

In one embodiment the device is an electrically insulating spacer arranged to mechanically and electrically separate two parts of a device which are arranged to be at different electrical potential.

In one embodiment, the ratio of the electrical conductivity of a first, high conductivity part of the material to the electrical conductivity of a second, low conductivity part of the material exceeds $10^2$. In many applications, this ratio will be considerably higher, such as for example in excess of $10^5$, in excess of $10^8$ or higher.

In one embodiment of the electric device, said element is arranged to be in physical contact with at least one second element of the device, wherein the material at the surface of said first element, which faces the second element, has an electrical conductivity which is of the same or similar order of magnitude as the conductivity of the second element.

Further provided is a method of producing a material for electrical applications. The method comprises treating different parts of a graphene oxide element differently, so as to achieve a different degree of reduction of the graphene oxide within the element, resulting in an element having a gradient in the electrical conductivity and/or permittivity.

In one embodiment of the method, at least one part of the element is exposed to a first temperature and a second part of the element is exposed to a second temperature, so as to achieve a temperature gradient in the element, wherein the first and second temperatures are different, and at least one of the first and second temperatures is 130° C. or higher.

In one embodiment of the method, at least one part of the element is exposed to irradiation, for example by UV, laser, X-ray, flash or electron beam radiation.

The graphene oxide element used in the method may for example comprise a composite material having a polymer matrix and particle fillers of graphene oxide. Alternatively, the graphene oxide element comprises graphene oxide paper.

Further aspects of the invention are set out in the following detailed description and in the accompanying claims.

BRIEF DESCRIPTION OF THE DRAWINGS

FIG. 5 is a schematic illustration of an embodiment of a σ∈-gradient material in the form of a composite material of a polymer matrix with filler particles of graphene oxide.

FIG. 6a illustrates an embodiment of a method of producing a σ∈-gradient material by annealing different parts of a GO element at different temperatures.

FIG. 6b illustrates an embodiment of a method of producing a σ∈-gradient material by irradiation of a GO element.

FIG. 7c shows a schematic cross section along the axial line of an embodiment of a cable termination.

FIG. 7d shows a schematic cross section along the axial line of another embodiment of a cable termination.

FIG. 8 is a schematic illustration of an embodiment of a power cable which includes a bridging element of σ∈-gradient material in the form of a bridging layer.

DETAILED DESCRIPTION

Figure 1:
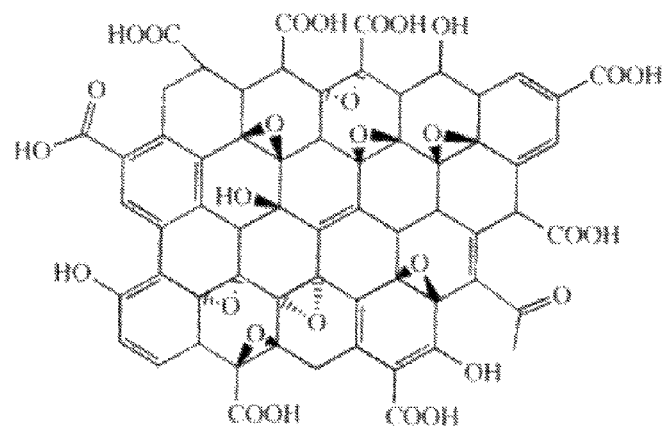
FIG. 1 shows an idealized chemical structure of graphene oxide (GO).

Graphene oxide (GO) is a layered carbon graphite of a single or a few layers, with abundant functional groups such as epoxy, hydroxyl and carboxyl functional groups. An idealized chemical structure of GO is shown in FIG. 1.

Graphene oxide has caught much interest in recent years, since the material is an intermediate product when graphene is produced from graphite. In ideal graphene, the one-atom thick planar version of carbon, $sp^2$-hybridized carbon atoms are arranged in a honeycomb lattice exhibiting high electrical conductivity. On the contrary, the abundance of functional groups in GO partly disrupts $sp^2$-hybridization in the lattice, with the GO consisting partly of tetrahedrally bonded $sp^a$ carbon atoms. GO is therefore insulating, and as-synthesised GO films typically exhibit a room temperature sheet resistance in the order of 1012 $\Omega sq^{-1}$ or higher.

There are various ways of reducing GO to increase its chemical affinity with graphene. A review of different methods of reducing GO is provided in "*The reduction of graphene oxide*" by Pei, N. and Cheng, H-M. in Carbon 2012; 50:3210-3228. Although GO has not yet been fully reduced to produce perfect graphene, the electrical conductivity of reduced GO, rGO, is vastly higher than the conductivity of the as-synthesised GO. Reduced GO having a conductivity in the order of $10^3$ S/cm has been achieved, while the conductivity of the as-synthesised GO material can be lower than $10^{-12}$ S/cm. Depending on method and conditions, different levels of restoration of the electronic structure of the graphene carbon lattice is achieved, leading to a broad range of conductivity values of different samples of reduced GO.

Thermal reduction is one way of reducing GO, and can for example be performed as thermal annealing. Other methods involve irradiation, for example by use of laser, UV, X-ray, flash or electron beam (e-beam) radiation, where flash irradiation involves irradiating the material by high intensity visible light, for example from a camera flash.

Measurements show that a different degree of reduction is obtained depending on the reduction circumstances. Hence, by varying the conditions under which the reduction is performed, the conductivity of reduced GO can be varied, the variation being due to a varying concentration of reduced GO.

In the following, a material comprising GO will be referred to as a GO material.

Figure 2:
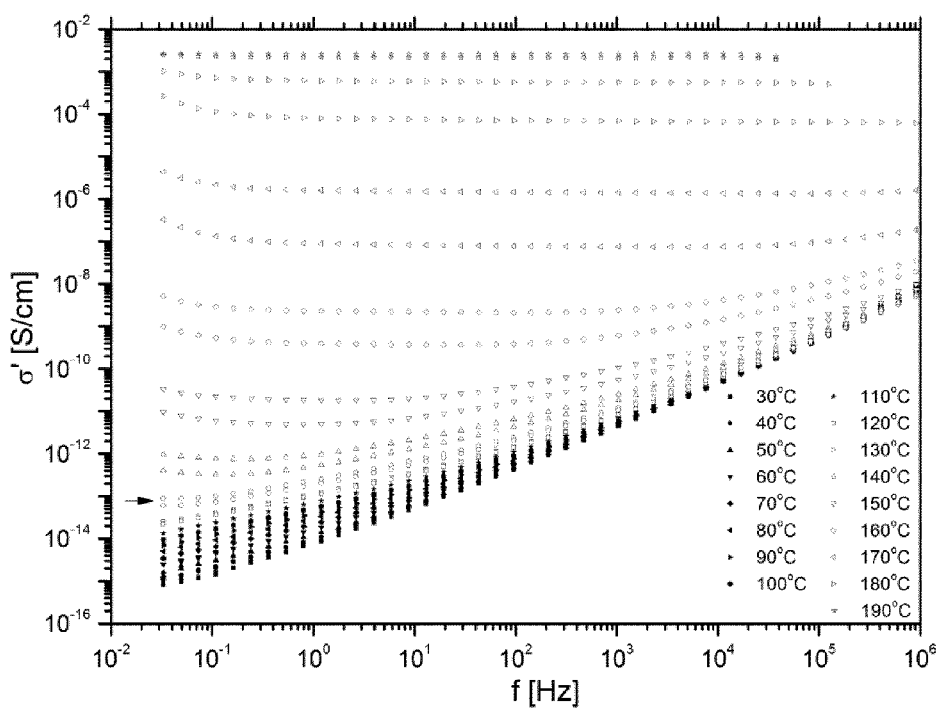
FIG. 2 shows results of isothermal measurements of the real part of conductivity σ' vs. frequency f for an element which has been exposed to annealing at different temperatures, resulting in different degrees of reduction.

In FIG. 2, the real part, σ', of the AC conductivity of an element of GO material, which is annealed at increasing temperatures, is plotted as a function of frequency f. The conductivity vs. frequency spectra were taken at 17 different temperatures from 30° C. to 190° C., with a step of 10° C. The measurements were performed isothermally.

Figure 3:
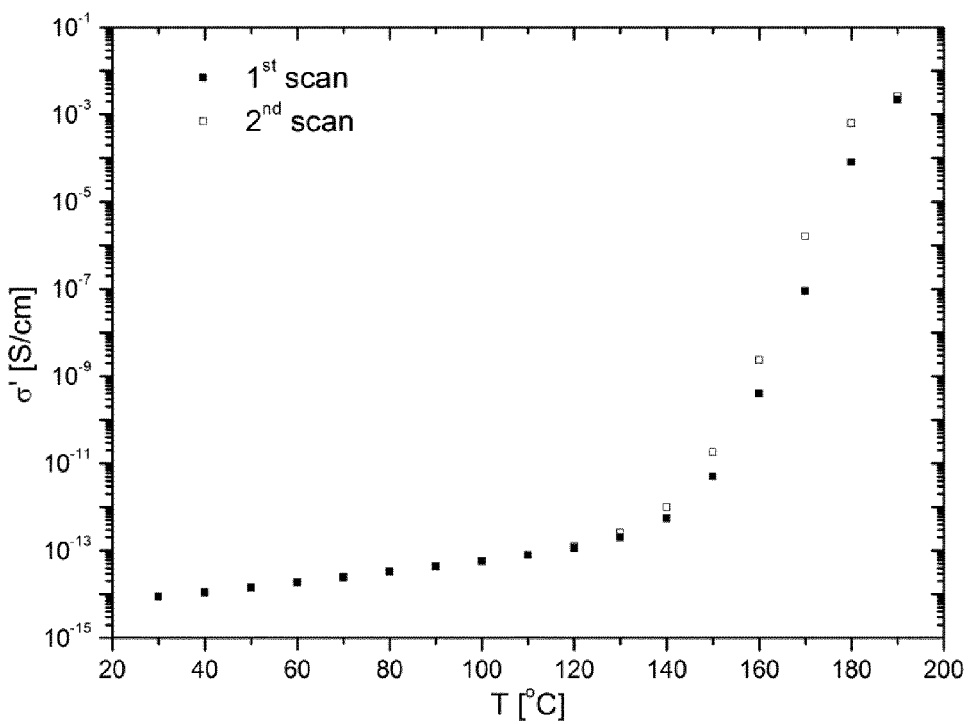
FIG. 3 is an alternative illustration of the measurement results of FIG. 2, where σ' is plotted as a function of annealing temperature at a fixed frequency of 1 Hz.

FIG. 3 is an alternative illustration of the measurement results of FIG. 3, where σ' at the frequency of 1 Hz is plotted as a function of annealing temperature. At each temperature, two consecutive measurements were taken, illustrated by filled and open squares, respectively.

The real part, σ', of the AC conductivity approaches the DC conductivity, $\sigma_{dc}$, of the element as the frequency approaches zero. An estimate of $\sigma_{dc}$ for each temperature can be taken from the plateau value of conductivity. For temperatures below 130° C., no plateaus of conductivity are seen and conductivity is only moderately increasing with temperature.

As can be seen in FIGS. 2 and 3, the conductivity increases continuously with annealing temperature. A more pronounced increase with increasing temperature is obtained for temperatures from around 130° C. and higher. As discussed below, this is also the first temperature where DC plateaus of conductivity can be seen at low frequencies, as well as the first temperature where an increase is observed between the $1^{st}$ and the $2^{nd}$ consequent frequency scans (cf. FIG. 3). Thus, the onset of thermal reduction of the GO element seems to occur around 130° C. In FIG. 2, the curve representing an annealing temperature of 130° C. is indicated by an arrow. The higher the temperature, the larger part of the GO will be reduced, and the higher the conductivity. At temperatures below 130° C., the weak increase in conductivity is mainly caused by temperature dependence of the conductivity of the material, i.e. by an increasing number of carriers in the conduction band with increasing temperature, and not by a chemical reaction in the material.

The ratio of the DC conductivity obtained at 190° C. to the DC conductivity obtained at 130° C. is over ten orders of magnitude: $\sigma_{dc}(190°\ C.)$ is around $2\cdot10^{-3}$ S/cm, while $\sigma_{dc}(130°\ C.)$ is in the order of $10^{-13}$ S/cm.

As mentioned above, a difference appears between the two consecutive scans of FIG. 3 at temperatures of 130° C. and higher. This difference indicates, as expected, that the amount of reduced GO in the element at a particular temperature varies with time—the annealing is on-going at the time when the measurements are being taken. The on-going annealing process can also be noticed in the slight increase in a' with decreasing frequency at temperatures where the annealing process has started at the observation time scales. The isothermal scans were performed from high to low frequencies. The differences between consecutive measurements were observed at the low frequency measurements where a longer time was required and thus, the annealing process had progressed in between the acquisition of two consecutive measurements.

Re-measuring the conductivity of the element once the element had returned to room temperature showed that the reduction process was irreversible: The conductivity at room temperature was found to be nearly the same as the high temperature value, only slightly lower, which is to be expected when taking into account the larger excitation of carriers into the conduction band at higher temperatures.

Figure 4:
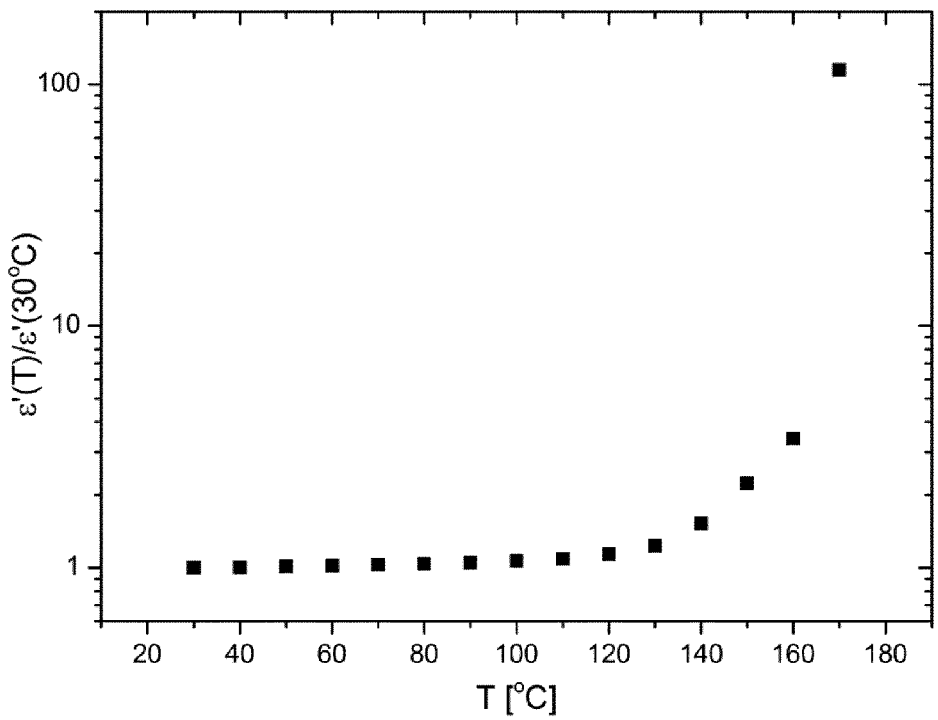
FIG. 4 shows how the normalized permittivity of a GO element varies with annealing temperature at a fixed frequency of 1 Hz.

The permittivity, ∈', of the material shows a corresponding increase with increasing annealing temperature. Measurements of the permittivity as a function of temperature at the frequency 1 Hz are illustrated in FIG. 4. In FIG. 4, the normalized permittivity, $\in_N$, is plotted as a function of temperature at the frequency of 1 Hz, where $\in_N$ is defined as $\in'(T)/\in'(30°\ C.)$. As can be seen in FIG. 4, the permittivity shows a dramatic increase with temperature at temperatures of around 130° C. and higher. In FIG. 4, measurement results within the temperature range of 20° C. to 170° C. are shown, and the higher temperatures have been omitted for resolution reasons. However, the dramatic increase continues for higher temperatures. For example, the normalized permittivity at 180° C., $\in_N(180°\ C.)$, was measured to be around 9000.

According to the invention, variations in conductivity and/or permittivity resulting from different methods of reducing graphene oxide can be exploited to produce a GO material which exhibits a gradient in the conductivity and/or the permittivity: By varying the level of reduction in the material, the conductivity and/or permittivity in the material will vary, and a gradient in the permittivity and conductivity is hence achieved. A GO material with a varying degree of reduction will here be referred to as a σ∈-gradient material, and a gradient in the conductivity and/or permittivity will be referred to as a conductivity/-permittivity gradient. An increase in GO reduction which causes a conductivity increase will often also cause a permittivity increase, and vice versa.

A conductivity/permittivity gradient can for example be useful in electric field control in electrical devices. For example, a σ∈-gradient material can be used in order to facilitate a smooth transition from a high electric field to a low electric field in an electric device, e.g. in cable insulation, cable joint, cable termination, bushing, microelectronic device, etc.

Furthermore, a σ∈-gradient material can also be useful on the surface of electrically insulating devices for use in high electric fields, such as electrically insulating spacers. By using a σ∈-gradient material on the surface, dissipation of any accumulated electric charges can be achieved in an interface-less manner.

A σ∈-gradient material will hence be beneficial in many different electrical devices, e.g. in devices wherein a voltage is applied across two materials of considerably different con-ductivity/permittivity: The σ∈-gradient material can be useful in a junction between a first further material and second further material of different electrical properties, where a first surface of the σ∈-gradient material is in contact with the first further material, and a second surface of the σ∈-gradient material is in contact with the second further material. The σ∈-gradient material can for example be included between two materials in a manner so that an electrical property of the first surface of the σ∈-gradient material is of a similar order of magnitude as the corresponding electrical property of the first further material which is in contact with the first surface, while the corresponding electric property of the second surface of the σ∈-gradient material is of a similar order of magnitude as the corresponding electric property of the second further material which is in contact with the second surface.

An element of a σ∈-gradient material which is used in an electric device will be referred to as a bridging element, since an element of such material can contribute to a smooth transition between a high field area and a low field area. Hence, a bridging element is a part of an electric device which is made of a GO material with a varying degree of reduction. Such bridging element can for example advantageously be arranged between two or more solid materials of different electric properties; or between a solid material and a fluid, where the solid material and the fluid are of different electrical properties.

A GO material with varying degree of GO reduction can for example be obtained by annealing a GO material at a temperature gradient, and/or by irradiation of a GO material.

The GO material to be used as a starting material in the production of a σ∈-gradient material could for example be a composite material including a polymer matrix with GO filler particles. In one implementation, a thermosetting polymer, which cures at a temperature below the reduction temperature of GO, is used as the composite matrix. The reduction temperature of GO is, as seen from the measurement results presented above, typically around 130° C. Examples of such thermosetting polymer matrices include epoxy, polyurethane (PU), and cross-linked polyethylene (XLPE). By using a thermosetting matrix material which cures below the reduction temperature of GO, the risk of reducing the GO filler particles during the curing process is eliminated.

In another implementation, an elastomer, such as silicone rubber or ethylene propylene diene (EPDM) rubber, is used as the composite matrix. In yet another implementation, a thermoplastic polymer is used as the composite matrix. Examples of thermoplastic polymers which could be used as the composite matrix include low or high density polyethylene (LDPE or HDPE), polyethylene terephthalate (PET), polybutylene terephthalate (PBT), polyethersulfone (PES), polysulfone (PSU), polyphenyl ether (PPE), polyphenylene sulfide (PPS), polyether imide (PEI), etc. When producing a composite material with a thermoplastic matrix by mixing the GO filler particles into the matrix material in molten form, the mixing process should preferably be quick if the melting temperature of the matrix lies above 130° C., so as to minimize any reduction of the GO filler particles. The cooling of the composite material could be performed according to a spatial cooling profile which gives rise to the desired $\sigma\in$-gradient.

In one embodiment of the invention wherein a composite GO material is used as the starting point, the concentration of GO filler particles in the polymer matrix is homogenous. Oftentimes, the concentration of GO filler particles is such that the percolation threshold is reached or exceeded. The concentration of GO filler particles could for example lie within the range of 0.1 to 50 volume %. In one implementation, the concentration lies within the range of 1-10 volume %.

In another implementation of a composite GO material, the concentration of GO filler particles varies within the composite material.

The GO filler particles can for example be in the form of a powder. A GO filler particle is typically in the shape of a flake, where a flake typically includes a stack of one or more single GO layers. The width of a flake shaped GO filler particle could for example lie within the range of 0.05 µm-1 cm, and the thickness of a flake shaped GO filler particle could for example lie within the range of 0.4 nm-10 µm. Filler particles of other dimensions could alternatively be used. The manufacture of such particles is well known, and can for example be performed by Hummer's method; or by a modified Hummer's method; or in any other suitable way. In Hummer's method, the oxidation of graphite to graphite oxide is accomplished by treating graphite with a water-free mixture of concentrated sulfuric acid, sodium nitrate and potassium permanganate. For a more complete description of Hummer's method, see for example "*The chemistry of graphene oxide*" by D. R. Dreyer, S. Park, C. W. Bielawski and R. S. Ruoff, Chem. Soc. Rev., 2010, 39, 228-240.

An example of a composite GO material 500 is schematically illustrated in FIG. 5. A polymer matrix 505 comprises GO-filler particles 510. A polymer based composite GO-material can be made in bulk dimensions, or in thin film dimensions. The composite GO-material shown in FIG. 5 is of thickness d.

Some examples of methods of producing a composite GO material 500 can be found in "Impressive Fatigue Life and Fracture Toughness Improvements in Graphene Oxide/Epoxy Composites" by D. R. Bortz, E. G. Heras, and I. M. Gullon, Macromolecules 2012, 45, 238-245, dx.doi.org/10.1021/ma201563k; and in "Enhancement of dispersion and bonding of graphene-polymer through wet transfer of functionalized graphene oxide" by M. Moazzami Gudarzi and F. Sharif, eXPRESS Polymer Letters Vol. 6, No. 12 (2012) 1017-1031. Other methods of producing composite GO material could alternatively be used.

In another embodiment, a GO material to be used as a starting point for the production of a $\sigma\in$-gradient material is obtained from GO paper. GO paper is commercially available, and can for example be produced from graphite oxide by Hummer's method followed by filtration of the resulting colloidal suspension through a membrane filter and drying. The thickness of GO paper often falls within the range of 10-100 µm, although paper of a different thickness could also be used.

GO paper can for example be useful as a starting material for a $\sigma\in$-gradient material in applications where only a thin layer of GO material is required. GO paper could also be used in applications where thicker sheets or bulks of $\sigma\in$-gradient material are required, and/or where larger areas of $\sigma\in$-gradient material would be useful: Several GO paper sheets could then be stacked and glued together to increase the thickness of the material, for example by means of an adhesive such as epoxy. Furthermore, an adhesive such as epoxy could be used to join a GO paper sheet to adjacent GO-paper sheets, in order to obtain a GO-paper sheet of a larger area.

A GO material to be used as the starting material for a $\sigma\in$-gradient material could also be obtained from a graphene paper or a free-standing graphene layer, which is oxidized in order to obtain a GO paper, or a free-standing GO layer. If desired, two or more GO sheets obtained in this way can be joined by means of an adhesive such as epoxy, in order to obtain a GO element of higher thickness and/or larger area.

The as-synthesized GO used in the experiment illustrated by FIGS. 2 to 4 was a commercially available GO paper produced using Hummer's method as described above.

In the following, different methods of obtaining an element of a $\sigma\in$-gradient material from GO will be discussed. The term element is used to refer to any piece of material, for example a large layer for cable insulation, a bulk piece of material, a thin film, etc.

As mentioned above, a $\sigma\in$-gradient material can be obtained by allowing the GO in a GO element to reduce to different degrees. A part of the GO element wherein a higher percentage of the GO has been reduced will thus have a higher conductivity, and vice versa. Different degrees of reduction within the same GO element can for example be achieved by irradiation, and/or by applying different temperatures to different parts of the element, where the temperature of at least one part of the element exceeds 130° C.

Annealing of a GO material at a temperature gradient can for example be performed by keeping one part of a GO element at a first temperature, and a second part of the element at a second temperature, where the first and second temperatures are different and at least one of them exceeds the reduction onset-temperature, which is normally around 130° C. Further parts of the element could be kept at further temperatures, if desired.

The annealing of a GO element at a temperature gradient will result in a $\sigma\in$-gradient material where the conductivity $\sigma$ and permittivity $\in$ increase from one part of the element to another. The highest conductivity $\sigma_H$ and the highest permittivity $\in_H$ will be obtained in the part of the element which is annealed at the highest temperature $T_{high}$ and vice versa. Thus, the different temperatures can be selected depending on the desired conductivity span of the σ∈-gradient material. An example of a table which could be used when selecting the annealing temperatures in the production of a σ∈-gradient material is provided below in Table 1. The numbers given in Table 1 are obtained from the measurements illustrated in FIGS. 2 to 4, illustrate the vast span of conductivities which can be obtained within the same element. However, the numbers are approximate in the sense that the degree of reduction at a particular temperature also depends on the time duration during which the element is held at the particular temperature, and therefore, a higher or lower conductivity can be obtained at a particular annealing temperature depending on the annealing time. However, measurements indicate that different components of the GO material will reduce at different temperatures, so that there is a maximum reduction which will be obtained at each temperature, regardless of annealing time.

TABLE 1

Real part of the AC conductivity at 1 Hz as obtained by annealing at different temperatures.

| σ' at 1 Hz (S/cm) | Annealing temperature T (° C.) |
|---|---|
| $2\ 10^{-13}$ | 130 |
| $6\ 10^{-13}$ | 140 |
| $5\ 10^{-12}$ | 150 |
| $4\ 10^{-10}$ | 160 |
| $9\ 10^{-8}$ | 170 |
| $8\ 10^{-5}$ | 180 |
| $2\ 10^{-3}$ | 190 |

Once reduced to a suitable σ∈-gradient, the operating temperature of a bridging element of an electrical device could for example be below 130° C. in order to minimize any further reduction of the GO material. However, depending on application, higher operating temperatures could also be used.

FIG. 6a illustrates how an element 600 of GO is annealed by keeping a first surface of the element 600 at a high temperature $T_{high}$, while keeping a second surface of the element 600 at a low temperature, $T_{low}$.

If an element is desired wherein a conductivity gradient is only present in parts of the element, one surface of the element could for example be kept at a temperature well below the reduction on-set temperature of 130° C. Furthermore, more than two different temperatures could be applied to a GO element, if desired, in order to obtain a more complex gradient in conductivity/permittivity.

The annealing time could for example lie within the range of 1 minute to 24 hours or longer. In one embodiment of the process of obtaining a σ∈-gradient material from a GO material, the annealing time lies within the range of 1-120 minutes once the desired temperature gradient has been reached. When annealing GO elements for which the thermal conductivity is low, such as some polymer composite materials 500, or when annealing large elements of GO materials, the annealing times will be longer in order to allow the temperature in the element to reach the desired temperature gradient.

Irradiation of a GO material with energetic radiation such as laser light, UV light, X-rays, flash or electron beam is another way of obtaining a variation in the degree of reduction of the GO material, and thereby a conductivity gradient. FIG. 6b illustrates a method of producing a σ∈-gradient material by irradiation of a part of a GO element 600.

Irradiation of GO material seems to cause reduction of the GO material by means of different mechanisms: The irradiation causes the GO material to heat up, thus contributing to thermal annealing of the material. Irradiation of the element surface will thus cause a temperature gradient in the element. The surface temperature obtained typically increases with increasing radiation intensity and irradiation time, and with increasing radiation frequency. Furthermore, the radiation may penetrate the element and interact with the chemical structure of the GO material, and/or increase the temperature within the element.

In one embodiment of laser irradiation reduction of GO, an Nd:YAG laser is used in a pulsed mode. The parameters of the pulsed Nd:YAG laser irradiation could for example be within the following ranges:

Average power: 0.1-10 W, for example 1-5 W;
Beam size: 1-20 mm, for example 5-10 mm;
Scan speed: 100-300 mm/min, for example 150-250 mm;
Pulse duration: 1-5 ms, for example 2-3 ms;
Pulse frequency: 1-50 Hz, for example 10-20 Hz;

Alternatively, a Nd:YAG laser in continuous mode could be used for reduction of the GO. The parameters of the continuous Nd:YAG laser irradiation could for example be within the following ranges:

Average power: 0.1-10 W, for example 0.5-3 W;
Beam size: 0.1-10 mm, for example 0.5-4 mm;
Scan speed: 100-300 mm/min, for example 150-250 mm;

The Nd:YAG laser irradiation is given as an example only, and other types of lasers could be used, for example Kr lasers; KrF excimer lasers; Yb:YAG lasers; InGaAsP lasers; Carbon monoxide lasers; Carbon dioxide lasers, picosecond lasers etc. In fact, any laser source which does not destroy the material could be used. Furthermore, other types of irradiation could be used, as mentioned above.

A σ∈-gradient material can be useful in many devices in electrical applications. Examples of devices comprising a bridging element of a σ∈-gradient material are shown in FIGS. 7-11. In FIGS. 7-11, a high conductivity/permittivity part of the bridging element is indicated by $\sigma_H$, and a low conductivity/permittivity part of the bridging element is indicated by $\sigma_L$. Thus, although conventionally used to denote conductivity, the greek letter σ is used in FIGS. 7-11 to denote conductivity and/or permittivity.

The degree of reduction could, in one implementation, be continuously increasing from a low conductivity/permittivity surface of the material to a high conductivity/permittivity surface of the material, such variation here referred to as a gradual variation. If the gradient in a σ∈-gradient material has been achieved by annealing, where the temperature variation was linear in the material during the annealing, the variation in conductivity and permittivity would typically be similar to the conductivity/permittivity variation of FIGS. 3 and 4, respectively. The variation of FIGS. 3 and 4 has an exponential character. Other variations in the conductivity/permittivity could alternatively be achieved, for example by applying a different temperature gradient; by irradiation; by varying annealing times, etc.

As explained above, a σ∈-gradient material can be used in order to facilitate a smooth transition from a high electric field to a low electric field in an electric device, e.g. in cable insulation, cable accessories such as cable joints and cable terminations, microelectronic devices, etc. In the following, FIGS. 7 to 10 illustrate a non-exhaustive selection of devices which comprise a bridging element of a σ∈-gradient material for purposes of field grading.

Figure 7A:
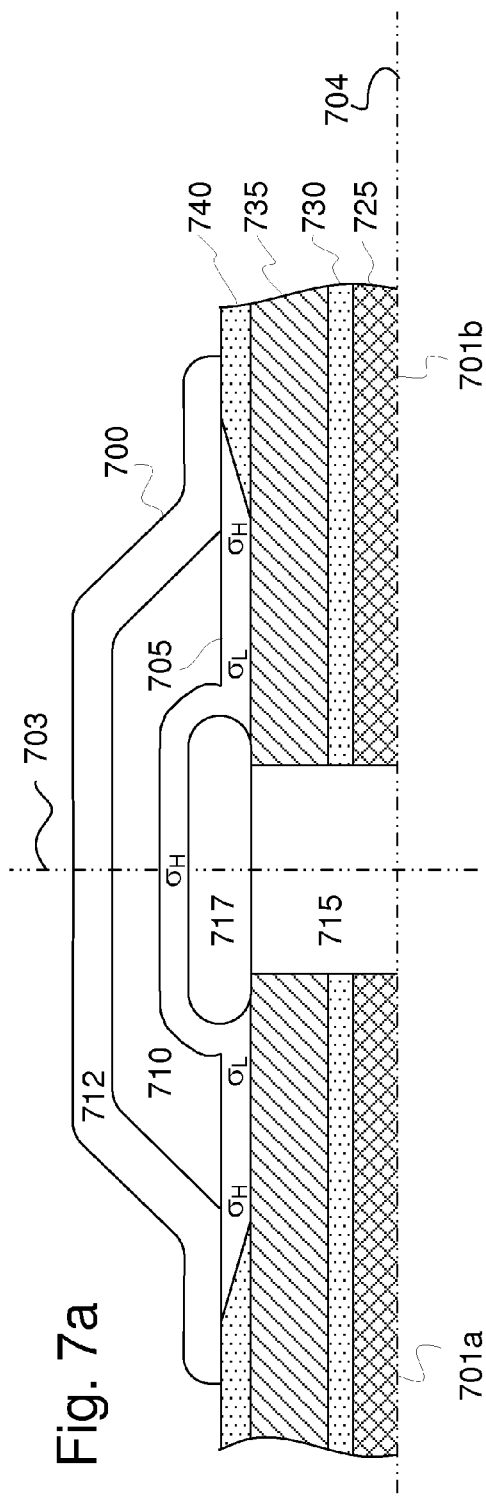
FIG. 7a shows a schematic cross section along the axial line of an embodiment of a cable joint.

An axial cross section of an example of an embodiment of a cable joint 700 which comprises a bridging element 705 of a σ∈-gradient material is schematically illustrated in FIG. 7*a*. Only the part of cable joint 700 which extends on a first side of the axial symmetry line 704 is shown. The cable joint 700 is arranged to provide insulation of the connection between two cables 701*a* and 701*b*. In addition to the bridging element 705, the cable joint of FIG. 7*a* is shown to further comprise an insulating part referred to as the joint insulation 710; an insulation screen in the form of a joint semiconducting layer 712; a joint contact 715 for connecting an end of the conductor of the first cable 701*a* to an end of the conductor of the second conductor 701*b*; and a semiconducting deflector 717 arranged as a screen around the joint contact 715. For illustration purposes, no details of the joint contact region are shown, but the joint contact region 715 is shown as a simple cylinder.

A cable 701*a,b* typically comprises a conductor 725, an inner semiconducting layer 730, an insulation layer 735 and an outer semiconducting layer 740.

The bridging element 705 of FIG. 7*a* is arranged so as to act as an extension of the outer semiconducting layer 740 of a cable 701*a,b* into the cable joint 700 when the cable joint 700 is in use, and the bridging element 705 is typically in electrical contact with the outer semiconducting layer 740 of the cables 701*a,b*. The bridging element 705 of FIG. 7*a* extends from the outer semiconducting layer 740 of the first cable 701*a*, into the joint insulation 710, around the deflector 717, to the outer semiconducting layer 740 of the second cable 701*b*. The bridging element 705 of FIG. 7*a* has a conductivity/permittivity gradient such a that the conductivity/permittivity takes a high value at the ends facing the outer semiconducting layers 740, as well as in the vicinity of the central line 703 where the electric field is expected to be high, while the conductivity/permittivity takes a lower value where the electric field is expected to be lower between the ends of the bridging element 705 and the middle of the bridging element 705. Hence, in this embodiment, the low conductivity/permittivity part of the bridging element 705 will mainly be interior to the bridging element 705.

The cable joint of FIG. 7*a* is shown to include a single bridging element 705 extending from one end of the cable joint 700 to the other. This arrangement can for example be advantageous in DC applications, but could also be used in AC cable joints. In FIG. 7*a*, the bridging element 705 is arranged on the outside of the deflector 717, and could alternatively be arranged for example between the joint contact 715 and the deflector 717.

Figure 7B:
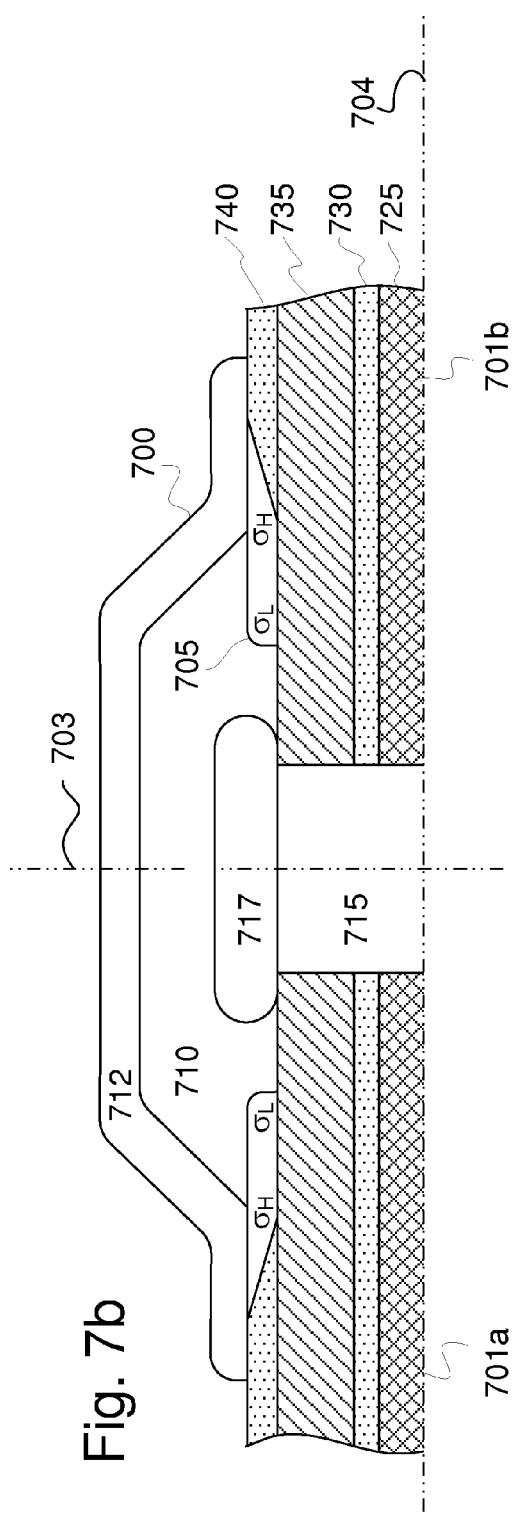
FIG. 7b shows a schematic cross section along the axial line of another embodiment of a cable joint.

Another embodiment of a cable joint 700 comprising a bridging element 705 of a σ∈-gradient material is shown in FIG. 7*b*. In this embodiment, the cable joint 700 comprises two bridging elements 705, one at each end of the cable joint 700. In the embodiment shown in FIG. 7*b*, a bridging element 705 extends, when the cable joint 700 is in use, from the outer semiconducting layer 740 of a cable 701, into the insulation layer 710, where the bridging element 705 ends. A high conductivity/permittivity surface of the bridging element 705 faces the outer semiconducting layer 740, while a low conductivity/-permittivity surface faces the joint insulation 710.

An embodiment wherein the cable joint 700 comprises two separate bridging elements 705 which do not meet can be particularly useful in AC applications, but can be applied to DC cable joints 700 as well. In FIG. 7*b*, the joint insulation 710 is shown to separate the bridging elements 705 and the deflector 717. In another implementation, a bridging element 705 could be arranged to extend all the way from the outer semiconducting layer 740 of a cable 701 to the deflector 717.

In FIG. 7*b*, the outside of bridging elements 705 is shown to be of a cylindrical shape, but a conical shape; a combination of a cylindrical and conical shape, or any other suitable shape could be contemplated.

In FIGS. 7*a* and 7*b*, the joint semiconducting layer 712 is shown to extend, in the axial direction, from the centre of the cable joint 700 beyond the interface between the bridging element 705 and the outer semiconducting layer 740, while the joint insulation does not reach as far, in the axial direction, as the interface between the bridging element 705 and the outer semiconducting layer 740. This arrangement is often beneficial in terms of field grading.

The cable joints 700 of FIGS. 7*a* and 7*b* are shown to be symmetrical around the central line 703. However, cable joints 700 arranged to join cables 701*a,b* of different diameters will have a first side having an opening of a first diameter, and a second side having an opening of a second diameter. The bridging element(s) 705 will be designed accordingly.

A bridging element 705 made from a σ∈-gradient material could similarly be beneficial in a cable termination. A cable termination could for example be designed in a similar manner as a first side of a cable joint 700. Examples of cable terminations 750 comprising a bridging element 705 are shown in FIGS. 7*c* and 7*d*. Only the part of cable termination 750 which extends on a first side of the axial symmetry line 704 is shown.

The cable termination 750 of FIG. 7*c* has a bridging element 705 which extends all through the cable termination 750, from the outer semiconducting layer 740 of the cable 701 to the further end 755 of the cable termination, where the conductor 725 of the cable 701 exits. The high conductivity/permittivity end of the bridging element 705 faces the outer semiconducting layer 740 of the cable 701, while the low conductivity/permittivity end faces the further end 755 of the cable termination 750. A cable termination 750 where the bridging element 705 extends through the entire cable termination 750 can be particularly useful in DC applications, but could also be used in AC applications.

The cable termination 750 of FIG. 7*d*, on the other hand, has a bridging element 705 which extends over only part of the distance between the further end 755 of the cable termination 750 and the outer semiconducting layer 740, with which the bridging element 705 is typically in electrical contact. The high conductivity end of such bridging element 705 faces the outer semiconducting layer 740 of the cable 701.

The bridging element 705 of a cable joint 700 or cable termination 750 could be a fixed part of the cable joint 700 or cable termination 750, respectively. In another implementation, the bridging element 705 could be mounted on the cable insulation 735 before the cable 701 is entered into the cable joint 700 or cable termination 750, for example in the form of a tape or a paper film.

The joint insulation 710 is often made of an insulating elastomer, such as silicon rubber or EPDM rubber. The bridging element 705 of FIG. 7 could for example be made from a composite of an elastomer with particle fillers of GO of varying degree of reduction, or from any other suitable material containing GO which has been reduced to a varying degree.

In an embodiment of a DC cable joint 700 or DC cable termination 750, the high conductivity $\sigma_H$ can for example be of the same or similar order of magnitude as the conductivity of the outer semiconducting layer 740, and the low conductivity $\sigma_L$ can for example be of the same or similar order of magnitude as the conductivity of the joint cable insulation 730.

Similarly, in an embodiment of an AC cable joint 700 or an AC cable termination 750, the permittivity $\in_H$ of the high permittivity part can for example be of the same or similar order of magnitude as the permittivity of the outer semiconducting layer 725, and the permittivity $\in_L$ of the low permittivity surface or low conductivity part 707b can for example be of the same or similar order of magnitude as the permittivity of the joint cable insulation 730.

The high conductivity part of the bridging element 705 could for example have a conductivity $\sigma_H$ in the range of $10^{-4}$-$10^2$ S/cm, while the low conductivity part could for example have a conductivity $\sigma_L$ in the range of $10^{-16}$-$10^{-12}$ S/cm, with a gradual conductivity change therebetween. In one implementation, the conductivities lie within the ranges $10^{-2}<\sigma_H<10^2$ S/cm and $10^{-16}<\sigma_L<10^{-15}$ S/cm.

In an AC application of cable joint 700, the permittivity of the high permittivity surface of the bridging element 705 could for example lie within the range of $10<\in_H<10^6$, while the permittivity of the low permittivity surface or part could for example lie within the range of $2<\in_L<10$, with a gradual change therebetween. In one implementation, the high and low permittivities of the bridging element 705 lie within the ranges of $10<\in_H<20$ and $2<\in_L<4$, respectively.

The thickness of the bridging element 705 of a cable joint 700 or cable termination 750 could for example be the same as or similar to the thickness of the outer semiconducting layer 240, which often falls within the range of 0.1-10 mm, and often within the range of 0.1-4 mm. However, often times, the thickness of the bridging element 705 exceeds the thickness of the outer semiconducting layer 740 and can for example take a value within the range of 1-10 times the thickness of the outer semiconducting layer, for example within the range of 1-3 times. The length of the bridging element 705, i.e. the extension of the bridging element 705 in the axial direction of the cable joint 700/cable termination 750, could for example lie within the range of 1 mm up to the length of the cable joint 700/cable termination 750, which could be 50 cm or more.

Although not shown in FIGS. 7a and 7b, the bridging element 705 of a cable joint 700 could, if desired, have a larger thickness than the outer semiconducting layer 740 of the cables 701a, b, as shown in FIGS. 7c and 7d. The bridging element 705 could for example overlap the outer semiconducting layer 740 of a cable, as shown in FIGS. 7a-7d, or could be arranged to just meet the outer semiconducting layer 740.

FIGS. 7a-7d are schematic drawings of the cable joints and cable terminations, and the cable accessories could, if desired, include further components, such as a housing, a metallic connection for the cable end (in case of cable terminations), and further stress relieving arrangements, such as for example geometrical field grading arrangements, etc.

FIG. 8 schematically illustrates a radial cross section of a power cable 800. The power cable 800 comprises a conductor 810, which is shown as a solid conductor (a conductor comprising a plurality of strands could alternatively be used). The cable 800 further comprises an inner semiconducting layer 815, an insulation layer 820 and an outer semiconducting layer 825.

Most of the voltage drop between the conductor and the (typically grounded) outside of the power cable occurs across the insulation layer 820. Typically, a homogenous electric field is desired in the insulation layer 820. In a conventional power cable 800, two major effects contribute to a variation in the electric field in the insulation layer 820 along the radial direction: The circular geometry contributes to a gradual decrease in the electric field towards to the outside of the cable 800; while a temperature increase, which is higher in the region close to the conductor 810, contributes to a gradual increase in the electric field towards the outside of the cable 800. However, these two contributions are typically of different magnitude, and there is therefore a risk that the electric field in the insulation layer 820 of power cable 800 will be inhomogeneous.

In order to smoothen the electric field in the insulation layer 820, a bridging element of 805 a $\sigma\in$-grading material could be included between the insulation layer 820 and at least one of the semiconducting layers.

In many traditional power cables 800, the electric field is higher towards the outside of the insulation layer 820, since the temperature will be lower towards the outside than close to the conductor 810, thus resulting in a lower conductivity in the insulation layer 820 towards the outside of the cable than near the conductor 810. In order to reduce this effect, a bridging element 805 could be used which has a higher conductivity/permittivity towards the outside of the power cable, and a lower conductivity/permittivity towards the conductor 810. This situation applies to the embodiment shown in FIG. 8. In other implementations, depending inter alia on the thickness of and voltage applied to the cable 800, the high field region could be located in the vicinity of the conductor 810, and a high conductivity/-permittivity surface of the bridging element 805 could be arranged to be adjacent to the inner semiconducting layer 815. In a yet further implementation, the power cable 805 comprises two bridging elements: one which is arranged at the outer surface of the insulation layer 820, and one which is arranged at the inner surface of the insulation layer 820.

In one embodiment of the power cable 800, the inner and/or the outer semiconducting layers 815 and 825 are formed by the bridging element(s) 805, so that no separate inner and/or outer semiconducting layer is required.

In one embodiment of a power cable 800 which comprises a bridging element 805, the entire insulation layer 820 is made from a GO material, where part of the insulation layer material is gradually reduced to form the bridging element 805. In another embodiment, the bridging element 805 is formed from a GO material which is gradually reduced, while another part of the insulation layer 820 is made from a different insulating material.

In a DC implementation of the cable 800, the high conductivity surface of bridging element 805 could for example have a conductivity $\sigma_H$ in the range of $10^{-4}$-$10^2$ S/cm, and the low conductivity surface of bridging element 805 could for example have a conductivity $\sigma_L$ in the range of $10^{-18}$-$10^{-12}$ S/cm, with a gradual conductivity change therebetween. In one implementation, the conductivities lie within the ranges $10^{-2}<\sigma_H<10^2$ S/cm and $10^{-18}<\sigma_L<10^{-16}$ S/cm.

In an embodiment of an AC power cable 800, the high permittivity $\in_H$ can for example be of in the range of 10-$10^6$ and the low permittivity $\in_L$ can for example be of in the range of 10-20. In one implementation, the permittivities lie within the ranges $2<\in_H<4$ and $2<\in_L<3$.

A power cable 800 which includes a bridging element 805 in the form of a bridging layer of $\sigma\in$-gradient material could for example be manufactured by extrusion, where the semiconducting layers and the insulation layers are co-extruded, and where the insulation layer 820 at least partly comprises a GO material, for example a composite of a polymer matrix and GO filler particles.

Figure 9:
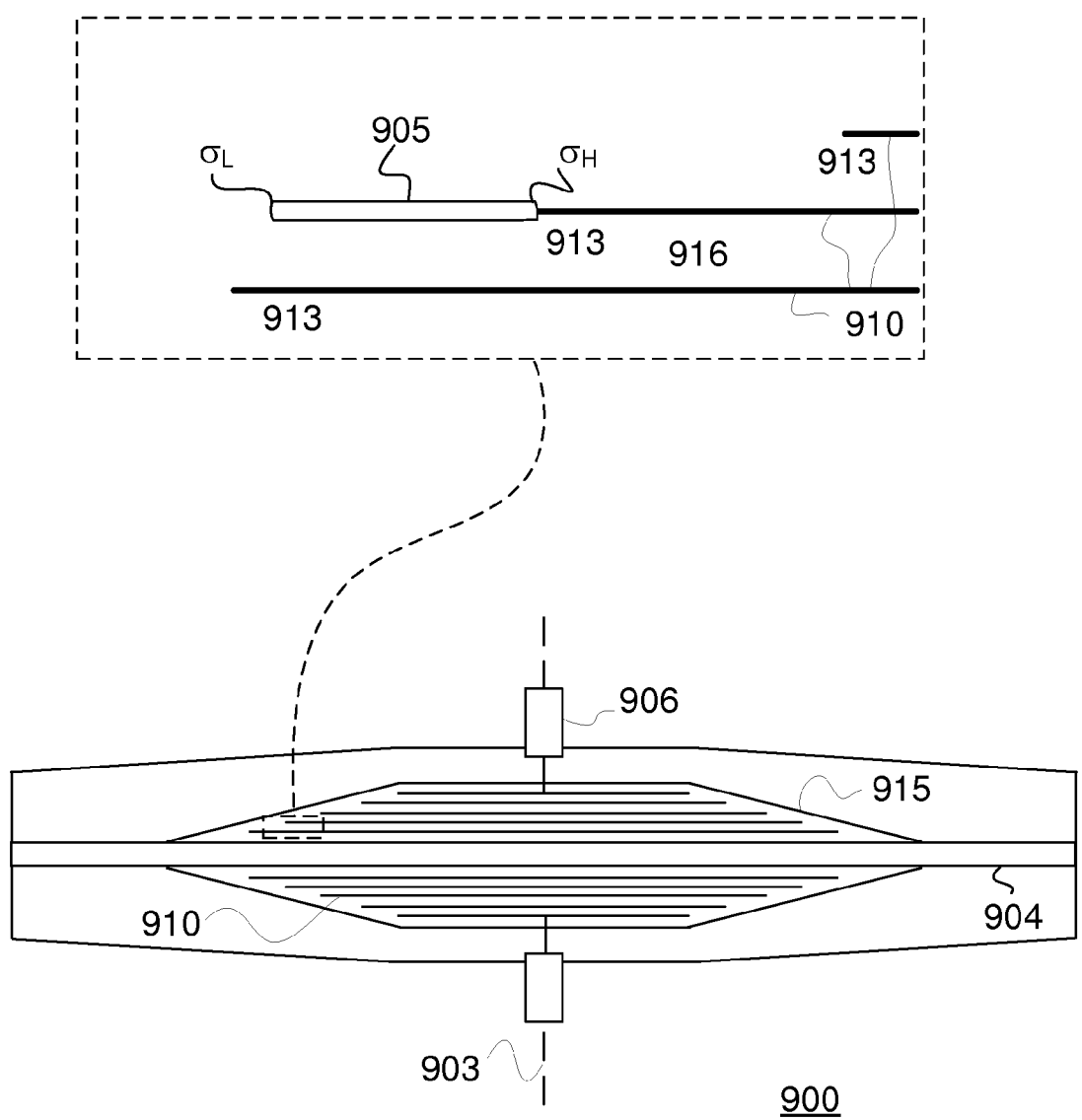
FIG. 9 is a schematic illustration of an embodiment of a bushing comprising a bridging element of σ∈-gradient material.

Bridging elements of a σ∈-gradient material can furthermore be used for field grading in bushings, both in AC and DC applications. In one embodiment, a bushing comprises coaxial foils made of a conducting material which coaxially surround conductor extending through the bushing, the coaxial foils forming a so called condenser core. The foils of a condenser core are typically separated by a dielectric insulating material, such as for example oil impregnated or resin impregnated paper, or other suitable electrically insulating material. A bridging element of a σ∈-gradient material could for example be applied at the foil edges, for example at the edges of the outermost foil; or on all foils; or on all foils but one, two or three foils; or on any other number of foil edges. The bridging element can thus function as a bridge between the foil and the insulating material. FIG. 9 schematically illustrates an example of a bushing 900 for carrying a current in a conductor 904 at high potential through a plane 903, where the bushing 900 comprises a bridging element 905 of a σ∈-gradient material. Also shown in FIG. 9 is a flange 906.

The bridging element 905 of the bushing 900 of FIG. 9 is arranged as an extension of a conductive foil 910 at a foil edge 913 in a condenser core 915. The bridging element 905 of FIG. 9 is centrally arranged as an extension of the foil edge 913. Alternatively, part of the bridging element 905 could be arranged on the surface of a foil 910 at the foil edge 913. The bridging element 905 of FIG. 9 could take any suitable length. In one embodiment, the length of the part of the bridging element 905 which extends beyond the foil edge 913 lies within the range of four times an interfoil separation distance of the bushing or less, however longer bridging elements 905 may also be contemplated. The high conductivity/permittivity surface of the bridging element 905 is arranged to be in contact with the conductive foil edge 913, while the low conductivity/permittivity surface of the bridging element is arranged to extend into the insulation material 916 between the foils 910, away from foil 910. The bushing 900 of FIG. 9 is given as an example only, and the use of σ∈-gradient material in bushings 900 is not limited to foil edges, or to bushings 900 comprising a condenser core 915, but could be used in any part of any bushing for purposes of field grading, charge dissipation etc.

In an embodiment of a DC bushing 900, the high conductivity $\sigma_H$ of a bridging element 905 could for example have a conductivity $\sigma_H$ in the range of $10^{-4}$-$10^2$ S/cm, while the low conductivity part could for example have a conductivity $\sigma_L$ in the range of $10^{-16}$-$10^{-12}$ S/cm, with a gradual conductivity change therebetween. In one implementation, the conductivities lie within the ranges $10^{-2}<\sigma_H<10^6$ S/cm and $10^{-16}<\sigma_L<10^{-13}$ S/cm.

In an embodiment of an AC bushing 900, the permittivity of the high permittivity surface of the bridging element 905 could for example lie within the range of $10<\in_H<10^6$, while the permittivity of the low permittivity surface or part could for example lie within the range of $2<\in_L<6$, with a gradual change therebetween. In one implementation, the high and low permittivities of the bridging element 705 lie within the ranges of $10<\in_H<10^6$ and $3<\in_L<5$, respectively.

The cable accessories 700, cable 800 and bushing 900 are given as examples only of devices wherein a bridging element of σ∈-gradient material would be beneficial in terms of field grading, and bridging elements of σ∈-gradient material can be used for field grading in all kinds of electrical equipment. A σ∈-gradient material could for example be used in all applications where conventional field grading materials, the conductivity/permittivity of which varies with electric field strength, are used today. For example, the σ∈-gradient material could be used in end corona protection in rotating high voltage machines.

Figure 10:
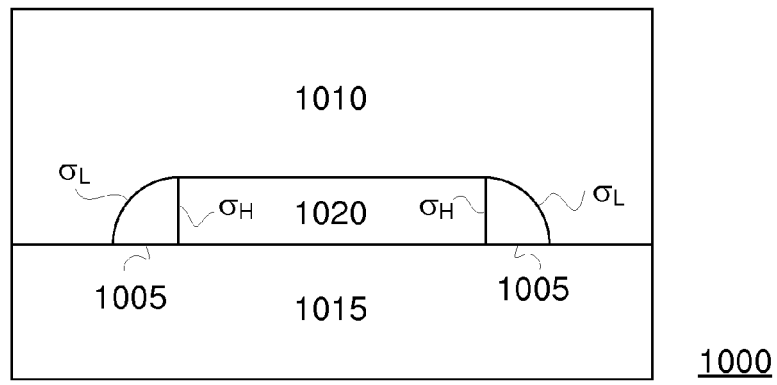
FIG. 10 is a schematic illustration of an embodiment of a microelectronics device comprising a bridging element of a σ∈-gradient material.

As shown above, the application of a σ∈-gradient material for field grading can for example be beneficial in high voltage and/or high power devices where the electric field is expected to be strong. In addition, a σ∈-gradient material can be useful in other fields of electro-technology where there is a desire to smoothen the electric field, such as in microelectronics. FIG. 10 shows a schematic illustration of a chip 1000 having an insulation layer 1010 on a substrate 1015, with an electric contact 1020 therebetween. The areas around the edges of the contact 1020 are often exposed to field stress. In order to smoothen the electric field around the edges of contact 1020, a bridging element 1005 can be arranged at the contact edges, so that a high conductivity surface of the bridging element 1005 is arranged to be in contact with the contact edges, while the conductivity of the surfaces of bridging element 1005 which face the substrate 1015 and the insulation layer 1010 is lower.

In one implementation, the conductivity of the surface facing the insulation layer 1010 is lower than the conductivity of the surface facing the substrate 1015.

The surface of bridging element 1005 which faces the contact 1020 can for example, in a DC application, have a conductivity $\sigma_H$ in the range of $10^{-4}<\sigma_H<10^6$ S/cm, and the surface facing the insulation layer 1010 can for example have a conductivity $\sigma_L$ in the range of $10^{-18}<\sigma_L<10^{-12}$ S/cm. In one implementation, the surface of bridging element 1005 which faces the contact 1020 has a conductivity $\sigma_H$ in the range of $10^{-2}<\sigma_H<10^6$ S/cm, while the surface facing the insulation layer 1010 has a conductivity $\sigma_L$ in the range of $10^{-16}<\sigma_L<10^{-14}$ S/cm.

Similarly, in a chip 1000 for AC applications, the bridging element 1005 can for example be designed such that the permittivity $\in_H$ of the high permittivity surface which is adjacent to the contact 1020 takes a value within the range of 10-$10^6$, and the permittivity $\in_L$ of the low permittivity surface adjacent to the insulation layer 1010 can for example take a value within the range of 2-4. In one implementation, the high and low permittivities of the bridging element 1005 lie within the ranges of $10<\in_H<10^6$ and $2<\in_L<3$ respectively.

The chip 1000 of FIG. 10 is only a schematic illustration of a microelectronics device where a bridging element 1005 can be useful, and a bridging element 1005 can be used in any microelectronics device wherein a smoothening of local field enhancement is desired.

A microelectronic chip 1000 is often covered by an insulation layer 1010 of a packaging material, e.g. silicon rubber or EPDM rubber. It is therefore often practical to use, in the bridging element 1005, a composite σ∈-gradient material based on a matrix of the same packaging material as the insulation layer 1010. However, other materials may alternatively be used.

The surface of bridging element 1005 which faces the insulation layer can for example be curved as shown in FIG. 10, in order to achieve also a geometrical grading of the electric field. This applies to other bridging elements as well, such as the bridging element 705 shown in FIG. 7, the bridging element 905 of FIG. 9. Furthermore, the field grading of the CE-gradient material can be combined with other field grading materials, if desired.

In the above, different electrical devices have been described in which a σ∈-gradient material is used for smoothening of the electric field. The electrical devices described above, wherein a σ∈-gradient material is used for smoothening of the electric field, are provided as examples, and a σ∈-gradient material can be used in any electrical device wherein grading of the electric field is desired.

In addition to field grading applications, a σ∈-gradient material can also be useful in other aspects of electrical applications. For example, a σ∈-gradient material can be used for the purpose of facilitating dissipation of accumulated charges on the surface of a device which is exposed to high electric fields, such as for example an electrically insulating spacer in a high voltage device.

Figure 11A:
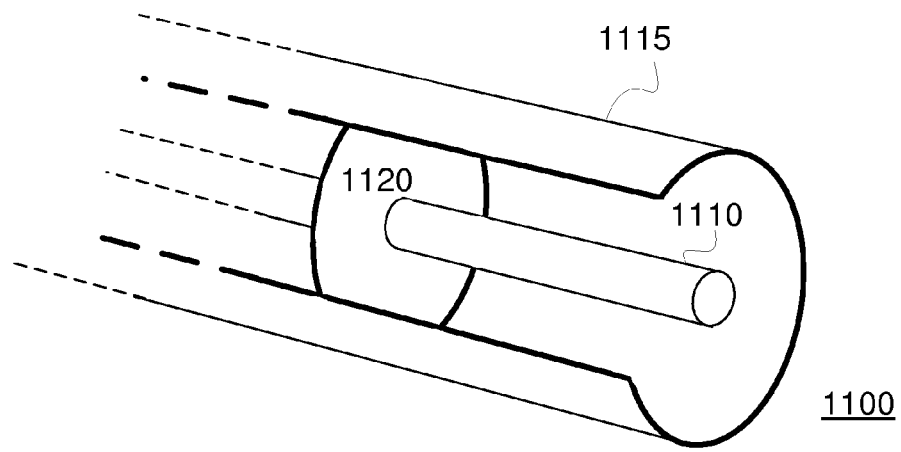
FIG. 11a is a schematic illustration of an embodiment of a gas insulated switchgear comprising an insulating spacer.
Figure 11B:
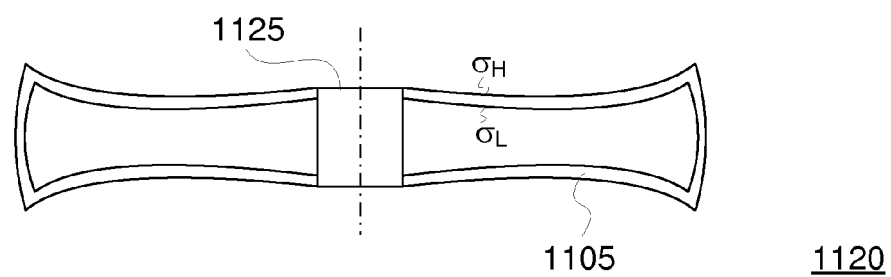
FIG. 11b is a cross section of an embodiment of an insulating spacer having a bridging element made of a σ∈-gradient material.

FIGS. 11a and 11b illustrate the use of a σ∈-graded material in a gas insulated switchgear (GIS) application for purposes of charge dissipation. FIG. 11a illustrates a part of a gas insulated switch gear 1100, where a conductor 1110 is arranged in a (typically metallic) cage 1115 which is filled with an insulating fluid, such as SF6. The gas insulated switchgear 1100 further comprises one or more electrically insulating spacers 1120, which are arranged to mechanically keep the conductor 1110 away from the cage 1115, or to separate regions filled with SF6 gas from non-filled regions, as well as to electrically insulate the conductor 1110 from the cage 1115.

At high electric fields, the insulating fluid inside the cage 1115 may dissociate into ions. Thus, there is a risk that ions will accumulate on the surface of the spacer, and such accumulated ions may eventually cause failure.

In order to reduce the risk of such surface charge failure, a bridging element 1105 can be arranged at the surface of the spacer 1120. A high conductivity surface of the bridging element 1105 forms the surface of the spacer 1120, while a low conductivity surface of the bridging element 1105 faces the inside of the spacer 1120. By including a bridging element 1105 at the surface of the spacer 1120, the conductivity at the surface of the spacer 1120 can be customized so that any gas ions which hit the spacer surface will be able to dissipate before a failure caused by accumulated charges occurs.

In this application of the σ∈-gradient material, the high conductivity surface of the bridging element 1105 will typically still have a comparatively low conductivity $\sigma_H$, for example in the order of $10^{-14}$ to $10^{-8}$ S/cm, in order to maintain the insulating properties of the spacer 1120. The conductivity $\sigma_L$ of the low conductivity surface of the bridging element 1105 could for example fall within the range of $10^{-16}$ to $10^{-12}$ S/cm. In one implementation, the high and low conductivities of the bridging element 1105 takes values with in the ranges of $10^{-12} < \sigma_H < 10^{-10}$, and $10^{-16} < v_H < 10^{-12}$, respectively. Furthermore, bridging element 1105, i.e. the surface region of the spacer 1120, wherein the conductivity is higher than the conductivity of the bulk material of the spacer 1120, could advantageously be thin, for example in the order of 1 μm to 1 mm.

FIG. 11b schematically illustrates a radial cross section of an example of a spacer 1120 having a bridging element 1105. The spacer 1120 is of concave cylindrical design, with a central hole 1125 for the conductor 1110 to extend through. The bridging element 1105 could for example cover the entire surface of the spacer 1120. Other geometrical designs of spacer 1120 could alternatively be used.

In one embodiment, the entire spacer 1120 is made from a GO material, where the GO material at the outer surface of the spacer 1120 is gradually reduced to form a bridging element 1105. In this way, dissipation of charges can be achieved in an interface-less manner, i.e. with no joint between different materials, thus minimizing the risk of electrical failure at material interfaces. In another embodiment, an outer layer of GO material is arranged at the surface of the spacer 1120, while the inner part of the spacer 1120 is of a different material.

In the above, the bridging element 1105 has been described to have a σ∈-gradient in the direction from the spacer surface towards the inside of the spacer. A bridging element 1105 in a GIS equipment could alternatively, or additionally, have a σ∈-gradient along the radius of the spacer, such σ∈-gradient for purposes of field grading: The electric field around the spacer 1120 is higher in the vicinity of the conductor 1110 than in the vicinity of the cage 1115, and by means of a bridging element 1105 which has a higher conductivity/-permittivity near the conductor 1110 than near the cage 1115, the electrical field will be smoothened.

In FIG. 11a, a spacer 1120 having a bridging element 1105 is used in a GIS equipment. However, a spacer 1120 having a bridging element 1105 can advantageously be used also in other devices including a spacer and where there is a risk that charges accumulate on the spacer surface.

A charge dissipating bridging element could also be used in other devices where there is a risk of failure caused by accumulated charges at the surface of the device.

As discussed above, a GO material, wherein the degree of reduction of the graphene oxide varies throughout the material, is useful in many electrical applications. The electric devices illustrated in FIGS. 7 to 11 are provided as examples only, and a σ∈-gradient material can be used in any type of electric device wherein a gradient in the conductivity and/or the permittivity is beneficial. As seen in the examples discussed above, the difference between the degree of reduction of a high conductivity/permittivity surface of a bridging element of a σ∈-gradient material and the degree of reduction of a low conductivity/permittivity surface of a bridging element will vary depending on the application, and the ranges indicated above are examples only. However, in most applications, the difference in reduction will be such that the ratio of the conductivity of the high conductivity surface to the conductivity of the low conductivity surface will exceed $10^2$. In many applications, the ratio will be considerably higher, for example $10^5$ or higher, or as high as $10^8$ or higher.

Unless otherwise stated, the conductivity and permittivity values in the above refer to room temperature values for electrical field levels in the range of 1-20 kV/mm. However, the invention can be used at other temperatures and in electric fields of other magnitudes.

Although various aspects of the invention are set out in the accompanying claims, other aspects of the invention include the combination of any features presented in the above description and/or in the accompanying claims, and not solely the combinations explicitly set out in the accompanying claims.

One skilled in the art will appreciate that the technology presented herein is not limited to the embodiments disclosed in the accompanying drawings and the foregoing detailed description, which are presented for purposes of illustration only, but it can be implemented in a number of different ways, and it is defined by the following claims.

The invention claimed is:

1. A material comprising reduced graphene oxide, wherein the degree of reduction of the graphene oxide exhibits a spatial variation so that the material exhibits a gradient in the electric conductivity and/or permittivity, and wherein the degree of reduction continuously increases from a low conductivity/permittivity surface of the material to a high conductivity/permittivity surface of the material;

wherein the ratio of the electrical conductivity of the high conductivity/permittivity surface of the material to the electrical conductivity of the low conductivity/permittivity surface of the material exceeds $10^2$; and wherein the material has a thickness of 0.1-10 mm.

2. The material of claim 1, wherein the material comprises a composite of a polymer matrix and filler particles comprising reduced graphene oxide, where the degree of reduction of the filler particles exhibit a spatial variation.

3. The material of claim 1, wherein the material comprises graphene oxide paper which has been reduced in a manner so that the degree of reduction exhibits a spatial variation.

4. The material of claim 3, wherein at least two sheets of graphene oxide paper are bonded by means of an adhesive.

5. An electric device comprising:
the material of claim 1.

6. The electric device of claim 5, further comprising:
an element made from said material; and
at least a second material of a second conductivity/permittivity and a third material of a third conductivity/permittivity, where the second conductivity/permittivity is higher than the third permittivity/conductivity,
wherein said element is arranged to bridge the first second and second third further materials,
wherein said element has at least two surfaces of different conductivity and/or permittivity, and
wherein the high conductivity/permittivity surface of said element is in physical contact with the second material and the low conductivity/permittivity surface of said element is in physical contact with the third material.

7. The electric device of claim 6, wherein the electric device is a cable accessory, wherein said element is arranged as an extension of a semiconducting layer into a joint insulation, and wherein a high conductivity/permittivity surface of said element is in physical contact with said semiconducting layer.

8. The electric device of claim 6, wherein the electric device is a power cable having an insulation layer and at least one semiconducting layer, wherein said element is arranged between at least part of the insulation layer and at least one of the at least one semiconducting layers, and wherein a high conductivity/permittivity surface of said element is in physical contact with the at least one of the at least one semiconducting layers.

9. The electric device of claim 6, further comprising:
an insulating spacer arranged to mechanically and electrically separate two parts of the device which are arranged to be at different electrical potential,
wherein said element forms at least part of the surface of the spacer in order to facilitate for electrical charges to leave the spacer, with a high conductivity/permittivity surface of said element facing the outside of the spacer.

10. The electric device of claim 6, wherein the electric device is a microelectronics component comprising at least one electric contact, and wherein said element is arranged so that a high conductivity/permittivity surface of the element is in physical contact with the electric contact.

11. The electric device of claim 5, wherein the electric device is a bushing.

12. The electric device of claim 6, wherein said element is arranged to be in physical contact with at least one second element of the device, and wherein the material at the surface of said element, which faces the second material, has an electrical conductivity and/or permittivity which is of the same order of magnitude as the conductivity/permittivity of the second material.

13. An electrically insulating device comprising:
an element made from the material of claim 1,
wherein said element forms at least part of the surface of the device in order to facilitate for electrical charges to leave the device, with a high conductivity/permittivity surface of said element facing the outside of the device.

14. The electrically insulating device of claim 13, wherein the device is an electrically insulating spacer arranged to mechanically and electrically separate two parts of a device which are arranged to be at different electrical potential.

15. A method of producing the material of claim 1 for electrical applications, the method comprising the step of:
treating different parts of a graphene oxide element differently, so as to achieve a different degree of reduction of the graphene oxide within the element, resulting in an element having a gradient in the electrical conductivity and/or permittivity, and
annealing for 1-120 minutes,
wherein the degree of reduction continuously increases through the material,
wherein at least one part of the element is exposed to irradiation by UV, laser, X-ray, or electron beam radiation, and
wherein the element has a thickness of 0.1-10 mm.

16. The method of claim 15, wherein at least one part of the element is exposed to a first temperature and a second part of the element is exposed to a second temperature, so as to achieve a temperature gradient in the sample, and wherein the first and second temperatures are different, and at least one of the first and second temperatures is 130° C. or higher.

17. The method of claim 15, wherein the graphene oxide element comprises a composite material having a polymer matrix and particle fillers of graphene oxide.

18. The method of claim 15, wherein the graphene oxide element comprises graphene oxide paper.

* * * * *